United States Patent [19]

Tsuru et al.

[11] Patent Number: 4,830,411
[45] Date of Patent: May 16, 1989

[54] THREADED JOINT FOR OIL-WELL PIPE

[75] Inventors: Eiji Tsuru; Shunji Nishi; Masao Ogasawara, all of Kitakyushu, Japan

[73] Assignee: Nippon Steel Corporation, Tokyo, Japan

[21] Appl. No.: 155,535

[22] Filed: Feb. 12, 1988

[30] Foreign Application Priority Data

Feb. 23, 1987 [JP] Japan .................. 62-39467

[51] Int. Cl.$^4$ ............................................. F16L 15/00
[52] U.S. Cl. ..................................... 285/334; 285/355
[58] Field of Search ................ 285/334, 355, 333, 390

[56] References Cited

U.S. PATENT DOCUMENTS

| | | | |
|---|---|---|---|
| 2,062,407 | 12/1936 | Eaton | 285/334 |
| 2,893,759 | 7/1959 | Blose | 285/334 |
| 2,924,876 | 2/1960 | Lewis | 285/333 X |
| 3,069,387 | 12/1962 | Allen et al. | 285/355 X |
| 3,359,013 | 12/1967 | Knox et al. | 285/334 X |
| 3,468,563 | 9/1969 | Duret | 285/355 X |
| 3,989,284 | 11/1976 | Blose | 285/334 X |
| 4,508,375 | 4/1985 | Patterson et al. | 285/390 X |
| 4,624,488 | 11/1986 | Furgerson | 285/334 |

Primary Examiner—Thomas F. Callaghan
Attorney, Agent, or Firm—Wenderoth, Lind & Ponack

[57] ABSTRACT

A threaded joint for oil-well pipe comprises a box having an internal thread, a pin having an external thread, a metal-to-metal sealing contact provided at the unthreaded tips of the box and pin, and a film of grease applied on the surface of the internal and external threads. The cross-sectional area of a void containing the screw axis left between the meshed internal and external threads is at least 0.6 mm$^2$ per pitch.

5 Claims, 5 Drawing Sheets (a) BEHAVIOR OF GREASE PRESSURE DURING MESHING (b) BEHAVIOR OF GREASE PRESSURE AFTER COMPLETION OF MESHING

THREADED JOINT FOR OIL-WELL PIPE

BACKGROUND OF THE INVENTION

1. Field of the Invention

This invention relates to a threaded joint for oil-well pipe, especially of the type to which grease according to the API (American Petroleum Institute) Standard is applied, that assures secure sealing under low stresses irrespective of the amount and application method of grease.

2. Description of the Prior Art

Generally, thread compound grease according to the API Standard is applied to the threads of joints meshed together for the purpose of lubrication and for assuring the desired liquid tightness. This practice is not limited to the threaded joints for oil-well piping according to the API Standard but is widely adopted with other special joints having metal-to-metal contact seals.

An example of a threaded joint shown in FIG. 1 consists of a box 1 and a pin 3 and has a metal-to-metal contact seal 5. As the metal-to-metal contact seal 5 provides the desired sealing, threaded portions 7 are not required to perform a sealing function. When used in a sulphide-polluted corroding environment, this type of threaded joints might undergo corrosion cracking under the influence of circumferential stress. To prevent such cracking, it has been long sought to reduce the amount of stress to which the box 1 is subjected. With conventional joints for oil-well pipes having the metal-to-metal contact seal 5, however, thread compound grease applied for the prevention of joint seizure fills the voids in the threaded portion 7 when the box and pin are meshed together. Experimentally, the grease was found to build up as high a pressure as 500 kg/cm$^2$, which remained substantially unchanged with time.

FIG. 2 graphically shows a change in grease pressure while the box and pin of a conventional threaded joint (with a pipe having an outside diameter of 178 mm and a void between the threads having a cross-sectional area of 0.10 mm$^2$) are being meshed together at (a) and a change in grease pressure after they have been meshed together at (b). The graphs evidence the grease pressure changes just as described above. In the graphs, solid lines show the grease pressures at a point closer to the metal-to-metal contact seal and dashed lines show those at a point distant from the metal-to-metal contact seal. In actual oil wells, therefore, pipes and joints are supposed to descend into the ground while the high grease pressure remains unattenuated. The high grease pressure sets up a circumferential stress of 40 kg/mm$^2$ or above in the meshed box. The circumferential stress increases as the liquid passing through the pipes exerts pressure from inside. Consequently, the box, if made of weak materials, may break in such sulphide-polluted environment. While, in addition, the box 1 expands, the pin 3 contracts as shown in FIG. 1. Then, the metal-to-metal contact seal 5 fails to maintain large enough sealing pressure, which often causes leakage from the joint. With conventional joints, joint stress is sometimes lowered by selecting an appropriate amount and method of grease application. But such control is too intricate and unreliable to be applied on the field.

The aforementioned problem exerts particularly profound influence on tubing (2⅜ inches to 7 inches in diameter) and casing (5½ inches to 11 inches in diameter) of the type required to have high sour-corrosion resistance and sealing ability.

SUMMARY OF THE INVENTION

An object of this invention is to provide a threaded joint for oil-well pipe that permits lowering the stress set up in the box thereof and lowering the grease pressure exerted on the interface of the meshed threads to maintain good sealing effect.

Another object of this invention is to provide a threaded joint for oil-well pipe that facilitates the removal of applied grease irrespective of the amount and method of application, thereby lowering the circumferential tensile stress set up in the box thereof and stabilizing the sealing effect produced by the metal-to-metal contact seal thereof.

To achieve the aforementioned objects, a threaded joint for oil-well pipe according to this invention, which is made up of a box with an internal thread, a pin with an external thread, with a metal-to-metal contact seal provided only between the unthreaded tips thereof and a film of grease applied on the surface of the threads, is designed so that the cross-sectional area of a void left between the meshed threads containing the screw axis is at least 0.6 mm$^2$ per pitch.

The threaded joint of this invention having the metal-to-metal contact seal only between the unthreaded tips of the box and pine assures low stress and stable sealing effect regardless of the direction and number of void by making the cross-sectional area of a void between the meshed threads not smaller than 0.6 mm$^2$ per pitch. Excessive compressive load can be coped with by increasing the cross-sectional area of a void between the threads by reducing the clearance between the stabbing flank surfaces of the internal and external threads.

DESCRIPTION OF THE PREFERRED EMBODIMENTS

Now preferred embodiments of this invention will be described in detail.

Figure 3:
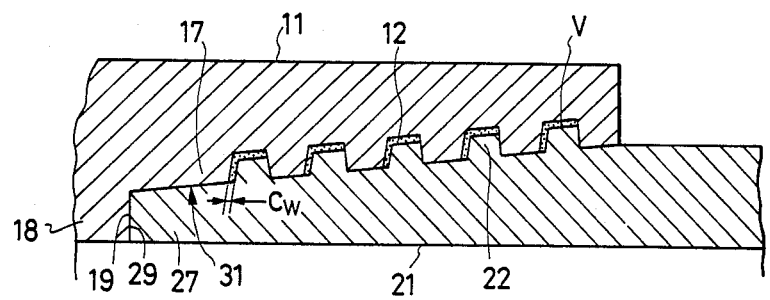
FIG. 3 is a partial cross-sectional view of a threaded joint according to this invention.

FIG. 3 shows a threaded joint of this invention which comprises a box 11 and pin 21.

The box 11 has an internal thread 12 followed by a conically tapered unthreaded internal sealing surface 17.

The pin 21 has an external thread 22 adapted to mesh with the internal thread 12, the external thread 22 being followed by a conically tapered unthreaded external sealing surface 27.

The box 11 and pin 21 are brought into engagement by means of the internal and external threads, whereupon the internal and external sealing surfaces, 17 and 27, establish a metal-to-metal contact seal 31 therebetween. Grease fills a void V between the internal and external threads. Sealing is practically achieved by the metal-to-metal contact seal 31. No such provision is made at the other end of the threads. In a meshed state, the end surface 19 of a shoulder 18 of the box 11 contacts the end surface 29 of the pin 21. This contact prevents overtightening during joint meshing and permits adjusting the appropriate amount of engagement at the metal-to-metal sealing contact 31 and between the box 11 containing the internal thread 12 and the pin 21 containing the external thread 22. If excessive compressive load acts on the joint, excessive stress is likely to be set up at the metal-to-metal sealing contact 31 since both end surfaces 19 and 29 are in contact, whereby the metal-to-metal sealing contact 31 could be damaged. Actually, however, a stabbing flank surface 15 of the internal thread cut on the box 11 and a stabbing flank surface 25 of the external thread cut on the pin 21, in combination, bear the applied compressive stress, thereby preventing the occurrence of excessive stress at the metal-to-metal contact seal 31.

Figure 4:
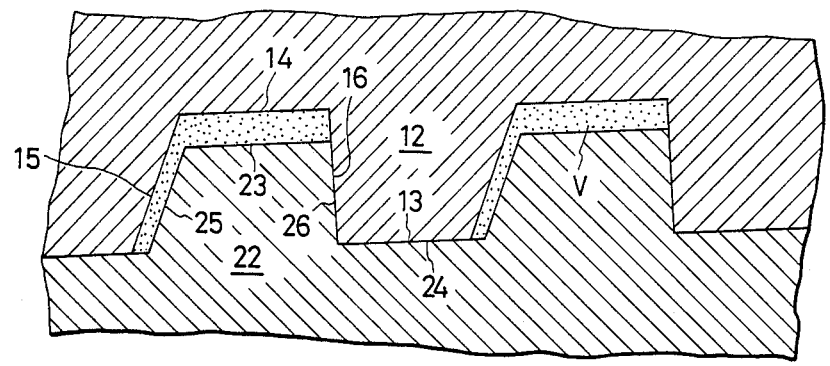
FIG. 4 is an enlarged cross-sectional view of the threads of the threaded joint shown in FIG. 3.

FIG. 4 is an enlarged view of the threads 12 and 22. The internal and external threads, 12 and 22, are buttress threads, with the crests 13 and 23 and roots 14 and 24 of both threads leaning forward with respect to the pipe axis. The crest 13 of the internal thread on the box 11 is in contact with the root 24 of the external tread on the pin 21. Or, the design may be changed so that the root 14 of the internal tread on the box 11 is in contact with the crest 23 of the external thread on the pin 21. The cross-sectional area of a void V between the threads containing the screw axis is 0.6 mm² per pitch.

When axial tensile load works on the joint, a load flank face (back face) 16 of the internal thread on the box 11 and a load flank face (back face) 26 of the external thread on the pin 21, in combination, bear the applied tensile load. When axial compressive load works on the joint, a stabbing flank face (forward face) 15 of the internal thread on the box 11 and a stabbing flank face (forward face) 25 of the external thread on the pin 21, in combination, bear the applied compressive load.

The technical reason why the crests 13 and 23 and the roots 14 and 24 of the threads are tapered with respect to the pipe axis is as follows:

Even if the internal and external threads are machined to leave a void of 0.6 mm² or above, the pressure built up by the grease entrapped in the void can hardly be lowered if the threads are sealed at both ends thereof, as with the extreme-line tubing according to the API Standard. If the crests and roots of the threads are parallel to the pipe axis in a joint removed of an external metal-to-metal contact seal (i.e., the should of the extreme-line tubing according to the API Standard), the threads readily move axially when compressive load works thereon, whereby axial load works on the metal-to-metal contact seal. Then metal-to-metal contact seal can often be seriously damaged. Provision of the taper prevents the undesirable movement of the threads in the screwing direction, lowers the stress set up in the box 11, prevents the deformation of the metal-to-metal contact seal 31 and thereby assures stable sealing. The taper also facilitates the removable of grease from the joints.

Figure 5:
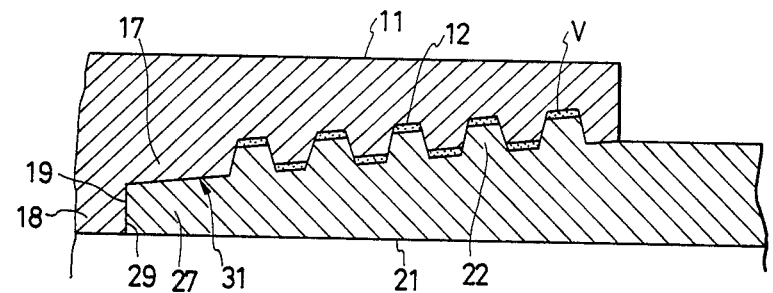
FIG. 5 is a partial cross-sectional view of another threaded joint according to this invention.
Figure 6:
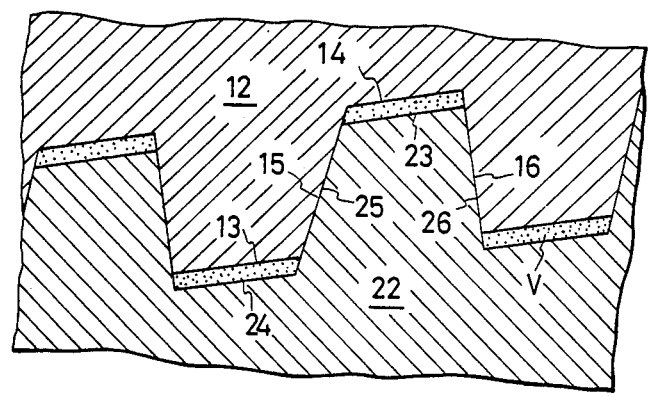
FIG. 6 is an enlarged cross-sectional view of the threads of the threaded joint shown in FIG. 5.

FIG. 5 shows another preferred of this ivnention, in which the parts similar to those in FIG. 4 are designated by similar reference characters. The flank faces 15 and 16 of the box 11 and the flank faces 25 and 26 of the pin 21 are in contact with each other. The root 14 of the internal thread on the box 11 and the crest 23 of the external thread on the pin 21 are kept out of contact, and so are the crest of the internal thread on the box 11 and the root 24 of the external thread on the pin 21. The cross-sectional area of a void V between the threads containing the screw axis is 0.6 mm² or above per pitch.

With this threaded joint, the void V between the threads, the cross-section of which is 0.6 mm² or above, is divided into two voids per pitch. That is, the sum of the cross-sectional areas of the two voids per pitch should be 0.6 mm² or above.

Figure 1:
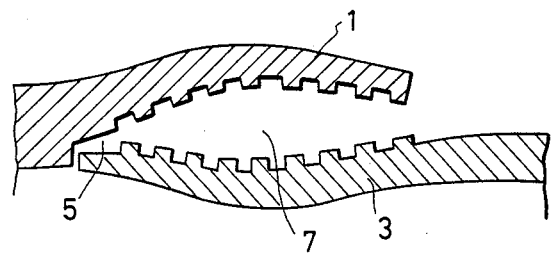
FIG. 1 is a cross-sectional view of a conventional threaded joint having a metal-to-metal contact seal, exaggerating the deformation caused by grease pressure.
Figure 2:
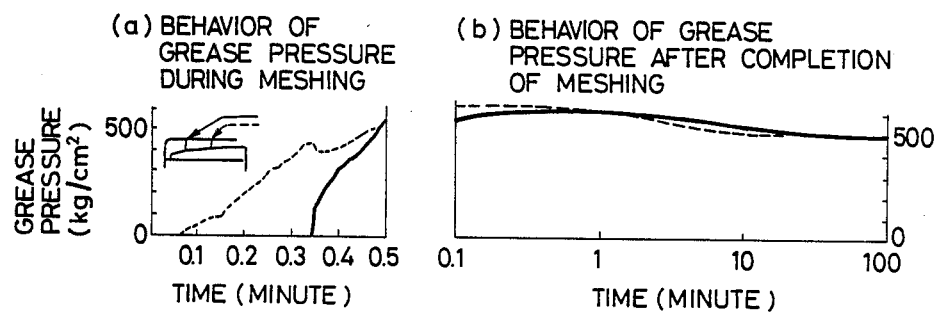
FIG. 2 graphically shows changes in grease pressure in a conventional threaded joint during and after meshing at (a) and a (b), respectively.
Figure 7:
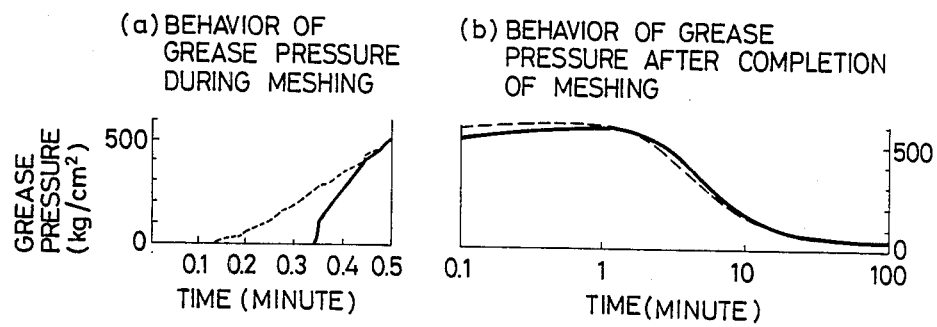
FIG. 7 graphically shows changes in grease pressure in a threaded joint of this invention during and after meshing at (a) and (b), respectively.

FIG. 7 shows the behavior of grease pressure in a threaded joint according to this invention. While a change in grease pressure during the thread meshing process is shown at (a) of FIG. 7, that after completion of meshing is shown at (b). Solid lines indicate changes in grease pressure at a point closer to the metal-to-metal contact seal and dashed lines indicate changes in grease pressure at a point distant therefrom As is obvious from the graphs, grease pressure, which is initially at the same level as with the conventional joint (see FIG. 2(a) and (b)), begins to drop sharply at a point about 1 minute after completion of meshing, then to as low as 50 kg/cm² in 20 minutes. FIG. 2 shows graphs for a conventional threaded joint (with a void between the internal and external threads being held at 0.1 mm²) comparable to those in FIG. 7.

Figure 8:
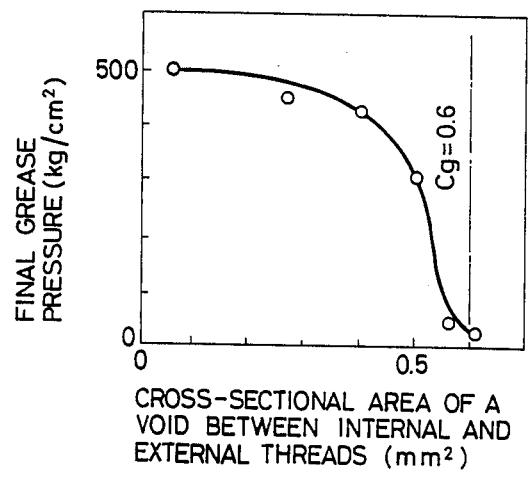
FIGS. 8 and 9 show the relationship between grease pressure and the cross-sectional area of void between the internal and external threads.
Figure 9:
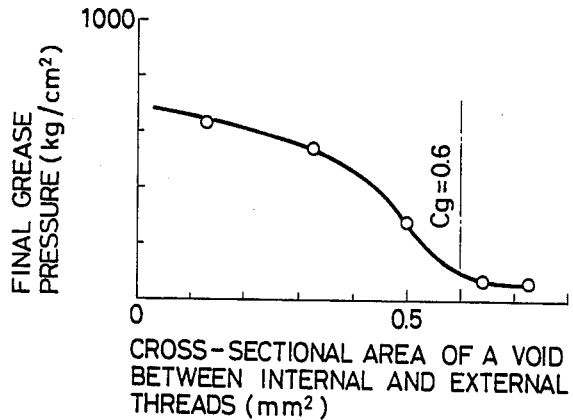

FIGS. 8 and 9 show the relationships between the final grease pressure and the cross-sectional area of a void between the internal and external threads for a threaded joint having a pipe outside diameter of 178 mm and 89 mm and a thread pitch of 5.08 mm and 4.33 mm, respectively. Grease pressure drops sharply as the cross-sectional are of a void between the threads becomes 0.4 mm² or above. Grease pressure falls below 100 kg/cm² when the cross-sectional are of the void exceeds 0.6 mm². Obviously, low stable grease pressure is obtained by making the cross-sectional area of a void between the internal and external threads not smaller than 0.6 mm² regardless of the pipe outside diameter and thread pitch, and also of the amount and method of grease application.

Figure 10:
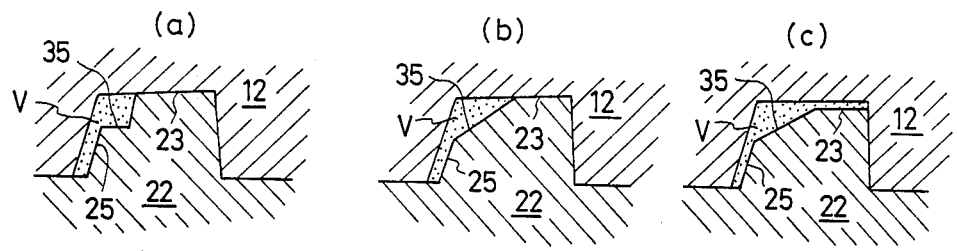
FIG. 10 shows cross-sectional views of different voids between the internal and external threads of threaded joints at (a), (b) and (c)

FIG. 10 shows three different types of threaded joints having a thread void of substantially the same cross-sectional area, in which the corner where the stabbing flank face (forward face) 25 and the crest 23 of the external thread 22 meet is cut away as shown at 35 in the figure. Experimentally, every joint proved to obtain stable low grease pressure when the cross-sectional area of a void between the threads was 0.6 mm² or above. This means that the ease with which grease can be removed depend also on both thread profile and the temperature (ambient) that exerts influence on the viscosity of grease. Accordingly, cutting off the corner of the threads is an effective means for assuring high removability of grease.

Figure 11:
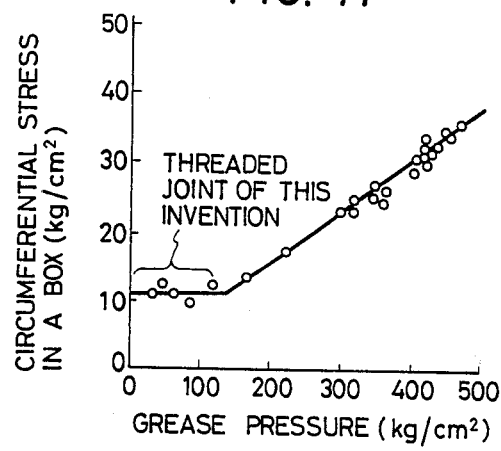
FIG. 11 graphically shows the relationship between grease pressure and the circumferential stress set up in the box.

FIG. 11 shows experimental and theoretical data on a drop in the circumferential stress set up in the box resulting from a decrease in grease pressure (pipe outside diameter=178 mm). The circumferential stress in the box of threaded joints of this invention is as low as ¼ to ½ of the value in conventional threaded joints in which grease pressure becomes as high as 400 kg/cm² to 500 kg/cm². Therefore, threaded joints of this invention exhibit high enough corrosion resistance even in a corroding environment.

Figure 12:
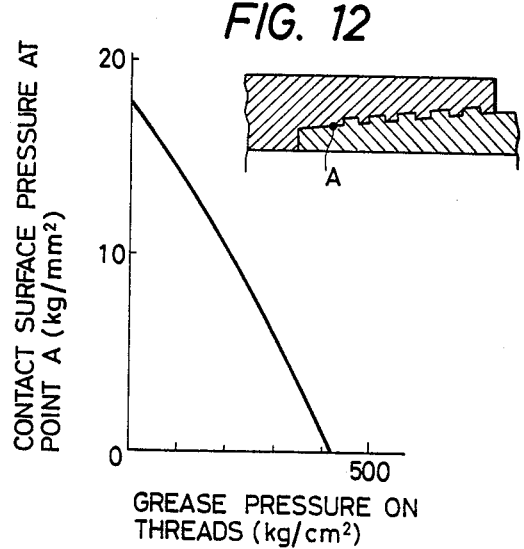
FIG. 12 graphically shows the relationship between grease pressure and the pressure built up at the metal-to-metal contact seal.

FIG. 12 shows the relationship between grease pressure between the threads and contact surface pressure at the metal-to-metal contact seal A determined by the finite element method (pipe outside diameter=178 mm). Contact surface pressure drops greatly when an increase in grease pressure. With a grease pressure of not higher than 100 kg/cm² that is built up in the threaded joints of this invention, however, a drop in contact surface pressure is very limited.

Figure 13:
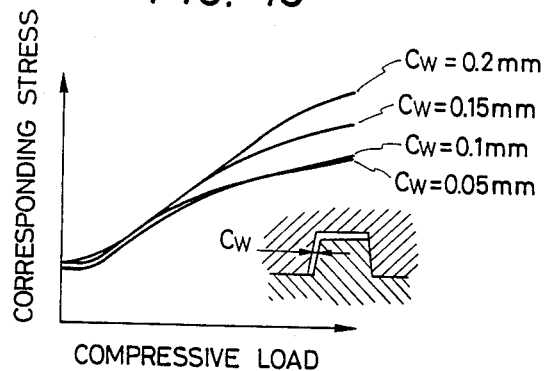
FIG. 13 graphically shows the relationship between compressive load and the stress set up at the metal-to-metal contact seal, using the clearance between the stabbing flank surfaces as a parameter.

FIG. 13 shows the stress behavior of the metal-to-metal contact seal observed when compressive stress was applied on threaded joints having different clearances between the stabbing flank faces of the internal and external threads. The clearance between the stabbing flank faces of the internal and external threads, which is designated by $C_W$ in FIG. 3, technically functions like the aforementioned tapering of the thread crest and root with respect to the pipe axis. If the clearance is large, the threads on the pin and box tend to move readily, whereby the metal-to-metal contact seal is subjects to heavier load and, therefore, might seriously damaged. With a small clearance, on the other hand, the threads also bear some portion of compressive load, thereby lessening the risk of damaging the metal-to-metal contact seal. The stress behavior at the metal-to-metal contact seal shows that reducing the clearance between the stabbing flank faces ceases to show the improving effect when the clearance becomes smaller than 0.1 mm. The risk of damaging the metal-to-metal contact seal by compressive load can be decreased by lowering grease pressure as described previously. Another effective risk-reducing means is to make the cross-sectional area of a void between the threads not smaller than 0.6 mm² and the clearance between the stabbing flank faces not larger than 0.1 mm.

Figure 14:
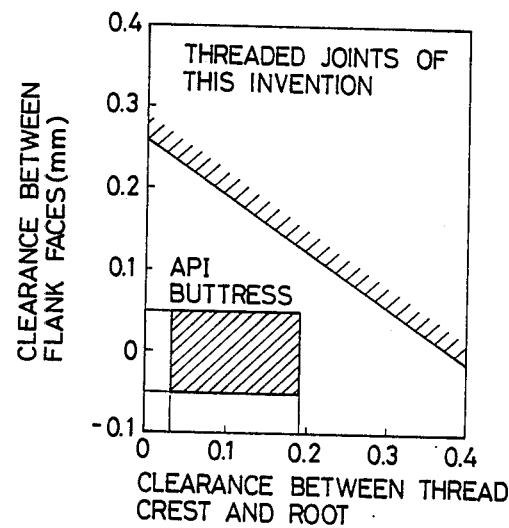
FIG. 14 graphically shows the relationship between the clearance between the crest and root of the threads and the clearance between the stabbing flank surfaces of the threads.

The voids between the internal and external threads of casings with buttress threads according to the API Standard is known. But the cross-sectional area of the largest void according to the API specification is only 0.45 mm². Therefore, practically no decrease in grease pressure occurs, as may be seen from FIG. 8. FIG. 14 compares the relationships between the clearance between the thread crest and root and the clearance between the stabbing flank faces of an API buttress-threaded joint and a threaded joint according to this invention (pipe outside diameter=178 mm and the cross-sectional area of a void between the internal and external threads=0.6 mm² or above). The clearances of the threaded joint according to this invention are outside the tolerances for the API buttress-threaded joint. U.S. Pat. No. 3,109,672 discloses a technique to lower circumferential stress set up in the box. With a clearance of 0.002 inch (0.05 mm) left between the thread crest and root as described in the Patent Gazette, however, the crosssectional area of a void between the internal and external threads will be only about 0.1 mm², bringing about practically no decrease in grease pressure and, therefore in stress. The maximum cross-sectional area of a void between the internal and external threads of known API extreme line casings is as large as 0.9 mm², but grease pressure therein does not drop because metalto-metal sealing contacts are provided at both ends of the thread thereof. It is presumed that the void in the extreme line casings of this type resulted from the limited accuracy of the machining technology of the day when the standard was established. Because both ends of the threads are sealed, it is obvious that the void is not intended for the lowering of grease pressure.

Figure 15:
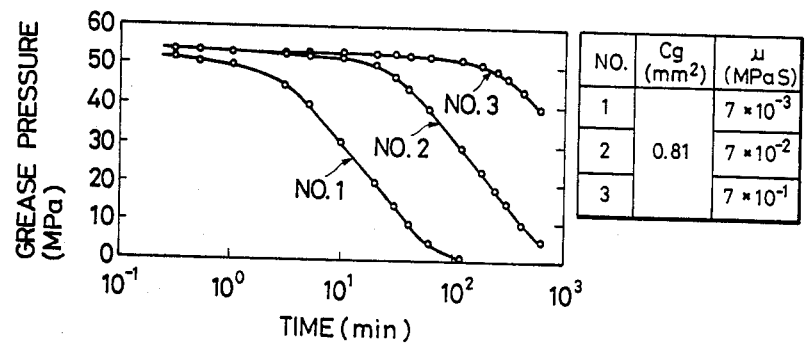
FIG. 15 graphically shows the relationship between grease pressure and the time elapsed after the meshing of the threads, using the viscosity of grease as a parameter.

FIG. 15 shows the attenuating behavior of grease pressure determined by the finite element method. When used at a temperature of not higher than −20° C., the viscosity of compound grease according to the API Standard increases by about two orders of magnitude. Then, as a consequence, the drop in pressure becomes very slow even with the threaded joints of this invention having a void of not smaller than 0.6 mm². In putting to practical use, therefore, due consideration, including the selection of a grease of appropriate viscosity, should be sued depending on the service temperature of each application.

What is claimed is:

1. A threaded joint for oil-well pipe which comprises:
   a box having an internal thread cut on the inner surface thereof and a conically tapered unthreaded internal sealing surface extending inwardly of the box from the internal thread;
   a pin having an external thread cut on the inner surface thereof to mesh with the internal thread and a conically tapered external sealing surface following the external thread;
   a void left between the internal and external threads and being filled with grease;
   a metal-to-metal sealing contact defined at one end of the internal and external threads by the internal and external sealing surfaces brought into tight contact with each other, and with the void between the internal and external threads at the other end being unsealed and leading to outside the joint; and
   said void having an area of at least 0.6 mm² per pitch in the cross section containing the screw axis.

2. A threaded joint according to claim 1, in which said internal and external threads are tapered.

3. A threaded joint according to claim 1, in which each of said internal and external threads has a mating stabbing flank surface, and a clearance between the stabbing flank surfaces of the internal and external threads is 0.1 mm or less.

4. A threaded joint according to claim 1, in which each of said internal and external threads has a mating stabbing flank surface, each of said internal and external threads has a crest, and a corner where the stabbing flank face of said internal thread and the crest of the external thread meet is cut away.

5. A threaded joint according to claim 1, in which said internal and external threads are of the buttress type.

* * * * *